May 23, 1972      W. D. MOORE      3,664,729

AUTOMATICALLY ADJUSTABLE REAR VIEW MIRROR

Filed March 25, 1970      3 Sheets-Sheet 1

INVENTOR:
WILLIS D. MOORE

Richards, Harris & Hubbard
ATTORNEYS

INVENTOR
WILLIS D. MOORE

Richards, Harris & Hubbard
ATTORNEYS

May 23, 1972  W. D. MOORE  3,664,729
AUTOMATICALLY ADJUSTABLE REAR VIEW MIRROR
Filed March 25, 1970  3 Sheets-Sheet 3
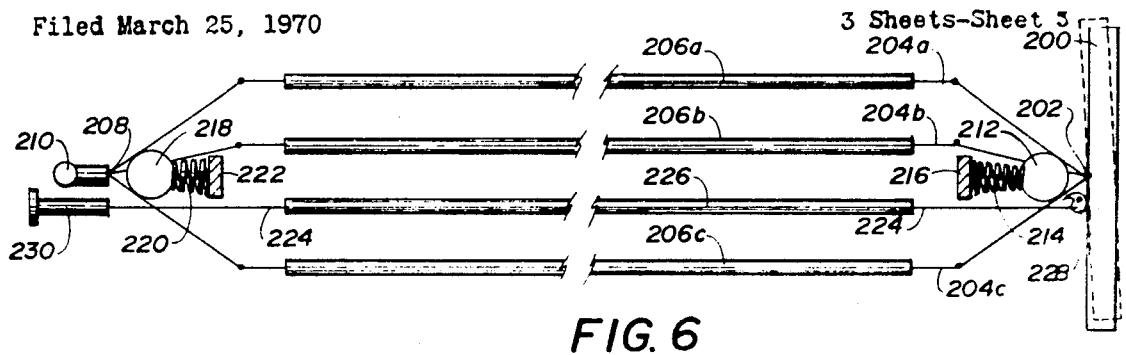
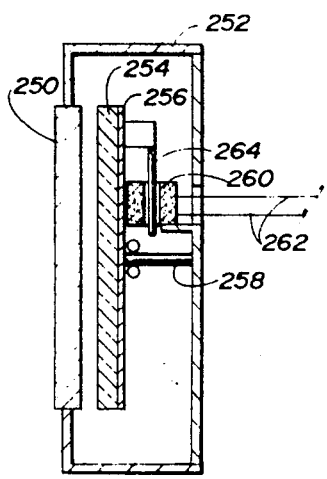
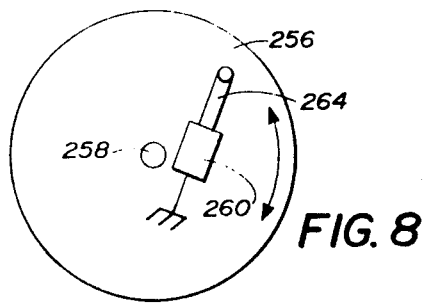
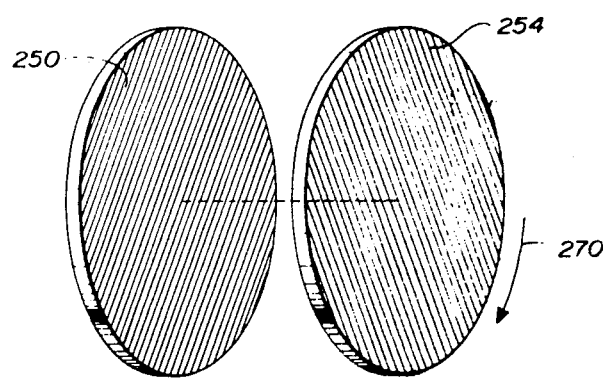
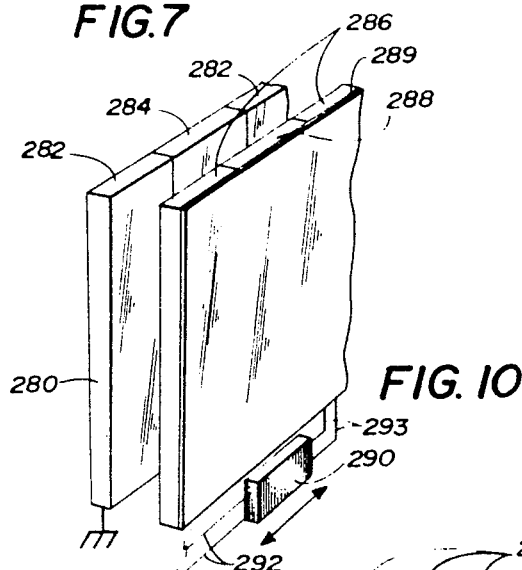
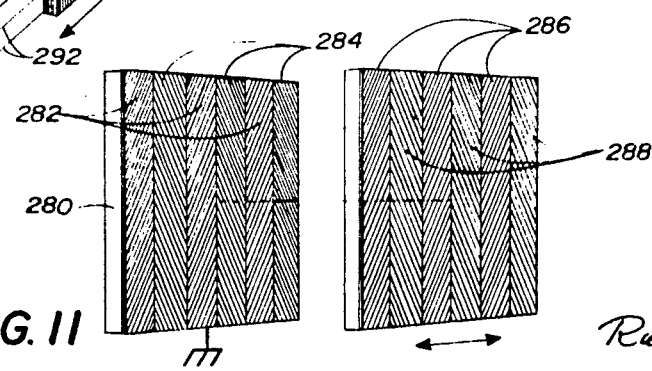
INVENTOR
WILLIS D. MOORE
Richards, Harris & Hubbard
ATTORNEYS United States Patent Office 3,664,729
Patented May 23, 1972

3,664,729
AUTOMATICALLY ADJUSTABLE REAR VIEW
MIRROR
Willis D. Moore, P.O. Box 392, Athens, Tex. 75751
Continuation-in-part of application Ser. No. 769,487,
Oct. 22, 1968. This application Mar. 25, 1970, Ser.
No. 22,612
Int. Cl. B60r 1/06; G02b 7/18
U.S. Cl. 350—281                               7 Claims

ABSTRACT OF THE DISCLOSURE

A vehicle rear view mirror assembly is disclosed which includes a mirror movable about a horizontal axis between a daytime operating position and a night anti-glare position. Structure which supports the mirror is movable about a vertical axis between two extreme positions for varying the field of vision provided by the mirror. A solenoid moves the mirror about the horizontal axis in dependence upon the actuation of the vehicle headlights. Another solenoid moves the mirror about the vertical axis in dependence upon the operation of the vehicle turn indicator. Other embodiments involve the use of structure for manually orienting the mirror from within the passenger compartment, and also involve relative movement between polarized transparent members for producing non-glare operation during night driving.

RELATED APPLICATIONS

This application is a continuation-in-part of the copending application Ser. No. 769,487, filed Oct. 22, 1968, by Willis D. Moore and entitled "Adjustable Rear View Mirror With Anti-Glare Structure," now Pat. No. 3,574,446.

FIELD OF THE INVENTION

This invention relates to vehicle mirrors, and more particularly to automatically movable mirrors of the non-glare type for use on vehicles.

THE PRIOR ART

It is generally acknowledged that the rear view mirrors presently utilized on automobiles are not completely satisfactory. For instance, in the publication "Motor Vehicle Rear Vision" by Charles R. Kelley et al., published August 1969, by the U.S. Department of Commerce National Bureau of Standards, it is disclosed that 95% of a group of professional automobile safety experts believe that the present standard automobile rear view mirror was marginal or inadequate. Among the inadequacies of existing rear view mirrors noted by this study were blind spots to the rear of the vehicle and mirror glare at night.

In an effort to overcome the deficiencies in previously developed vehicle mirrors, the present applicant heretofore developed a mirror assembly providing the benefits of automatic non-glade mirror operation, in combination with a mirror automatically movable upon actuation of the turn signal lever on an automobile. Such a system is disclosed in applicant's copending application Ser. No. 769,487, filed Oct. 22, 1968 and entitled "Adjustable Rear View Mirror With Anti-Glare Structure." While the above-noted mirror assembly provided advantages over prior automobile rear view mirrors, it has been found that improvements were desirable in order to provide economy and simplicity of automatic mirror operation.

SUMMARY OF THE INVENTION

In accordance with the present invention, a mirror is mounted for movement about first and second perpendicular axes. Structure is provided for moving the mirror about the first axis in dependence upon the operation of the vehicle turn indicator. Structure is also provided for moving the mirror about the second axis in dependence upon the actuation of the vehicle headlights.

In accordance with another aspect of the invention, a vehicle rear view mirror is movable about a horizontal axis between a normal operating position and an anti-glare position. Structure supports the mirror and is movable about a vertical axis between two extreme positions for varying the field of vision provided by the mirror. Circuitry is provided for controlling the movement of the mirror about the horizontal and vertical axes in dependence upon operation of the vehicle light switch and the vehicle turn signal indicator.

In accordance with another aspect of the invention, a vehicle mirror has a polarized front surface. A polarized transparent member is disposed in front of the mirror. Structure is provided for selectively moving the transparent member and the mirror relative to one another for selectively varying the amount of light reflected by the mirror.

DESCRIPTION OF THE DRAWINGS

For a more complete understanding of the present invention and for further objects and advantages thereof, reference is now made to the following description taken in conjunction with the accompanying drawings, in which:

FIG. 6 is a somewhat diagrammatic illustration of another embodiment of the invention;

FIGS. 7–9 illustrate another embodiment of the invention for controlling the reflecting characteristics of the vehicle mirror; and FIGS. 10–11 illustrate yet another embodiment of the invention for controlling the light reflecting properties of the vehicle mirror.

DESCRIPTION OF THE PREFERRED
EMBODIMENTS

Figure 1:
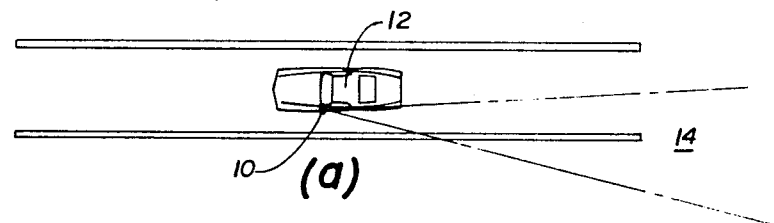
FIGS. 1a–b illustrate how the field of vision of the present rear view mirror is varried when a turn or change of driving lane is contemplated by the vehicle operator.

FIG. 1a illustrates the present mirror assembly 10 located on the side of the vehicle 12. When the vehicle 12 is driving along a relatively straight path, the mirror field of vision designated generally by the numeral 14 is directly behind the vehicle 12. However, when the driver of the vehicle 12 operates the left-hand directional signal lever to indicate an expected turn or a change of driving lanes, the field of vision of the mirror assembly 10 is shifted to the position 16 shown in FIG. 1b in order to shift the rear vision of the vehicle operator toward the left. This vision shift enables the vehicle operator to more clearly see another vehicle 18 which might interfere with the upcoming left turn or change of driving lanes. Additionally, as will be subsequently described, in nighttime conditions an anti-glare member is automatically operated to prevent the vehicle operator from being blinded by the headlights of rearwardly approaching vehicles.

The degree of mirror displacement which is optimum for a particular mirror according to the invention will vary according to operating conditions, but it has been found that the displacement of about 10° of the field of vision is advantageous for making left turns or when changing lanes to the left. Of course, the amount of displacement of the mirror will vary depending upon the location of the mirror and with respect to the driver position.

Figure 2:
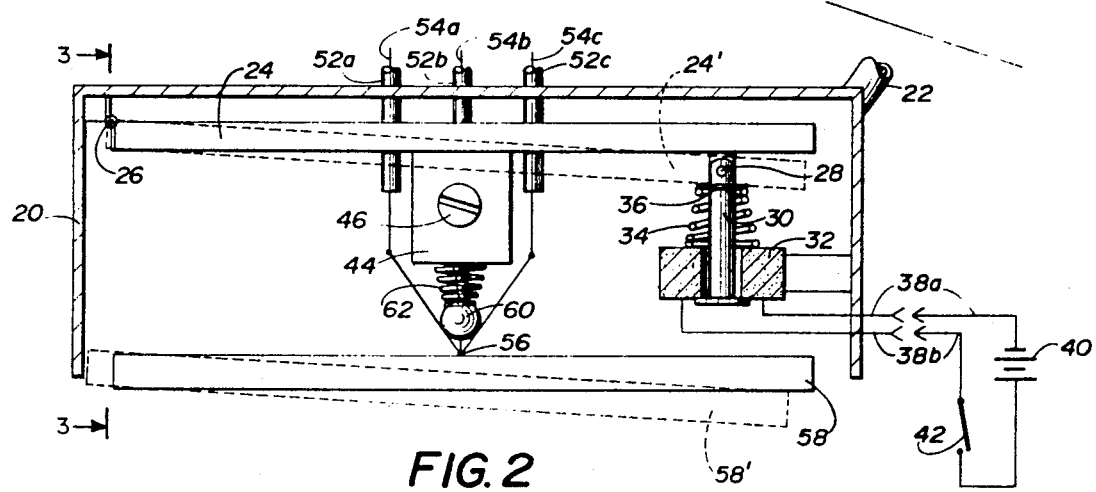
FIG. 2 is a somewhat diagrammatic top view of one embodiment of the present mirror assembly.
Figure 3:
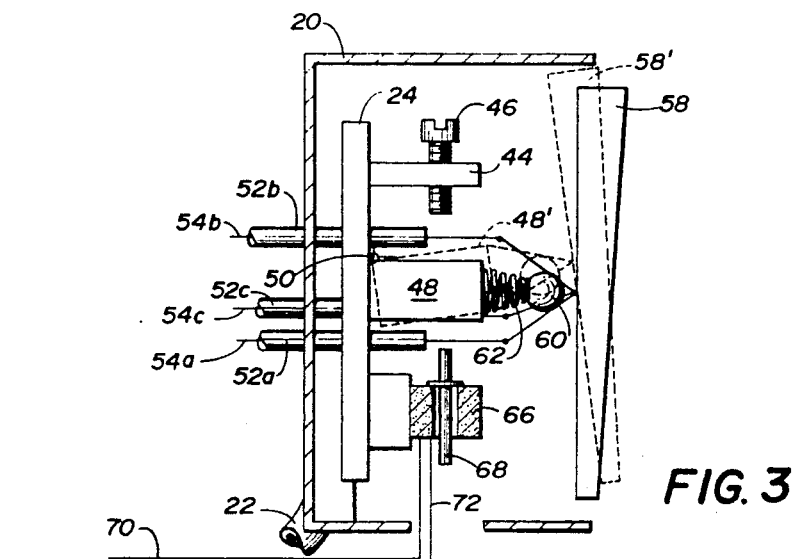
FIG. 3 is a sectional view of the mirror assembly shown in FIG. 2 taken generally along the section lines 3—3.

FIGS. 2 and 3 illustrate an embodiment of the invention comprising a housing 20 which is adapted to be attached to the side of a vehicle by a support member 22 in a conventional manner. If desired, member 22 may include a ball swivel joint with resulting simplicity of construction. A rear plate 24 is pivotally connected to the housing 20 by a hinge 26. The rear plate 24 is also pivotally connected by pin 28 to a solenoid shaft 30. The shaft 30 extends through a solenoid coil 32 which is rigidly connected to the interior of the housing 20. A spring 34 is positioned between an annular ring 36 on shaft 30 and the solenoid coil 32. The solenoid coil 32 is connected by wires 38a–b to the vehicle battery 40 and the vehicle turn indicator switch 42.

The rear plate 24 supports an overhanging member 44 into which is threaded a stop bolt 46. As best shown in FIG. 3, the rear plate 24 supports a block 48 at a pivot point 50. Three sleeve members 52a–c extend through the rear wall of the housing 20 and extend through apertures, not shown, in the rear plate 24. The sleeves 52a–c are rigidly supported in the housing 20, while the rear plate 24 may move relative to the sleeves 52a–c. Wires 54a–c extend through the respective sleeves and are joined at one end thereof at a common point 56 to the center of a mirror 58.

As shown in FIG. 3, mirror 58 comprises a conventional prism mirror which may be moved between glare and non-glare positions. A ball member 60 is firmly held against the wires 54a–c by a spring member 62 which abuts the block 48. It will thus be seen that the block 48, along with the wires 54a–c, centrally supports the mirror 58.

A solenoid coil 66 is rigidly connected to the rear plate 24 below the block 48. A solenoid shaft 68 is movable vertically upon energization of the coil 66. In the energized position, the shaft 68 extends upwardly into contact with block 48 in order to tip the block 48 upwardly about the pivot point 50. Coil 66 is connected to wires 70 and 72. Wire 70 connects to a contact 74. A corresponding contact 76 is connected via lead 78 to one terminal of the vehicle battery 40. The other terminal of battery 40 is connected via lead 80 to the vehicle light switch 82 located on the dashboard of the vehicle. When switch 82 is energized, current is provided through lead 80 and a lead 84 to the vehicle headlights 86. Wire 72 connects with lead 84. Lead 78 is also connected via lead 88 to solenoid coil 90. A solenoid shaft 92 is connected to a bypass button 93 and is normally biased against contacts 74 and 76 by a spring 94. The solenoid shaft 92 also have a contact ring 96 at the end thereof for contacting contacts 98 and 100 for connecting solenoid coil 90 to lead 84. It should be understood that other thrust generating devices such as a vacuum diaphragm may be used in place of a solenoid in the present invention.

In operation of the embodiment shown in FIGS. 2 and 3, when the vehicle is traveling a straight path in the daytime, the mirror 58 is located in the illustrated solid line position. When it is desired to make a left turn or to change into a left lane, the vehicle turn indicator 42 is operated to connect the battery 40 across the solenoid coil 32. The shaft 30 of the solenoid is thus moved against the force of the spring 34 to move the rear plate 24 about the hinge 26 to the dotted line position identified generally by 24'. Movement of the rear plate 24 moves the entire mirror assembly, including the block 48 which supports the mirror 58. Therefore, the mirror 58 is moved to the dotted line position identified generally as 58'. This moves the field of vision of the rear view mirror to the position 16 shown in FIGS. 1b. When the turn indicator signal 42 is again opened, the solenoid coil 32 is deenergized and the spring 34 forces the shaft 30 back to the illustrated position. The mirror 58 is thus returned to its normal position to provide the rear field of vision 14 shown in FIG. 1a.

The solid line position of mirror 58 shown in FIG. 3 is the normal operating condition for the mirror for daytime operation. When non-glare operation of the mirror is desired due to nighttime conditions, the vehicle light switch 82 is energized to thereby connect the automobile battery 40 across the headlights 86. Simultaneously, current flows from the battery 40 through the leads 80 and 84, and through the wire 72 to the solenoid 66. Current flow also exists through the wire 70 through the contacts 74 and 76 and through the lead 78 back to the vehicle battery 40.

Energization of the solenoid coil 66 causes the solenoid shaft 68 to be lifted upwardly to tilt the block 48 to the dotted line position identified as 48'. Due to the fact that the block 48 carries the mirror 58, the mirror 58 is tilted upwardly to the dotted line position 58'. Position 58' is the anti-glare position of the mirror, and the reflectivity of the mirror is thus reduced to prevent headlight glare from interfering with the vehicle operator. When the headlights of the vehicle are turned off, the solenoid 66 is deenergized and the shaft 68 returns to the illustrated position to again return the mirror 58 to the normal operating position.

When the vehicle headlights are turned on, and it is desired to position the mirror 58 in a normal operating position, such as in the event of fog or the like, the bypass button 93 is depressed. This causes the shaft 92 to close against contacts 98 and 100. Current flow thus occurs through the solenoid coil 90 to energize the same to maintain the shaft 93 in the depressed position. Depression of the shaft 93 removes electrical contact between the contacts 74 and 76 to thereby deenergize the coil 66 and return the mirror 58 to the normal operating position. Energization of the coil 90 maintains the shaft 92 in the depressed position until the vehicle light switch 82 is operated to turn the lights 86 off, after which the bypass button 93 is again outwardly extended. In one embodiment, the bypass switch is incorporated into the headlight switch as a coaxial switch similar to that conventionally used as a windshield wiper washer switch.

The wires 54a–c shown in FIGS. 2 and 3 extend through the sleeves 52a–c to a position inside the vehicle driver's compartment, wherein they are attached to a manually operable lever, as will be later described with respect to FIG. 6. The driver of the vehicle may thus move the lever to position the mirror 58 in any desired adjusted position. The present mirror may be adjusted to the individual characteristics of each driver for normal operation. When the turn signal of the vehicle is operated, the mirror automatically shifts to provide a view of oncoming cars in the manner shown in FIG. 1b. When the vehicle is operated at night, and anti-glare protection is needed, the mirror is automatically pivoted to the position 58' shown in FIG. 3 to provide non-glare operation. While the present mirror has been shown and illustrated in the left-hand side of a vehicle, it will be understood that the present mirror could also be used on the right side, or in other locations, of a vehicle.

Figure 4:
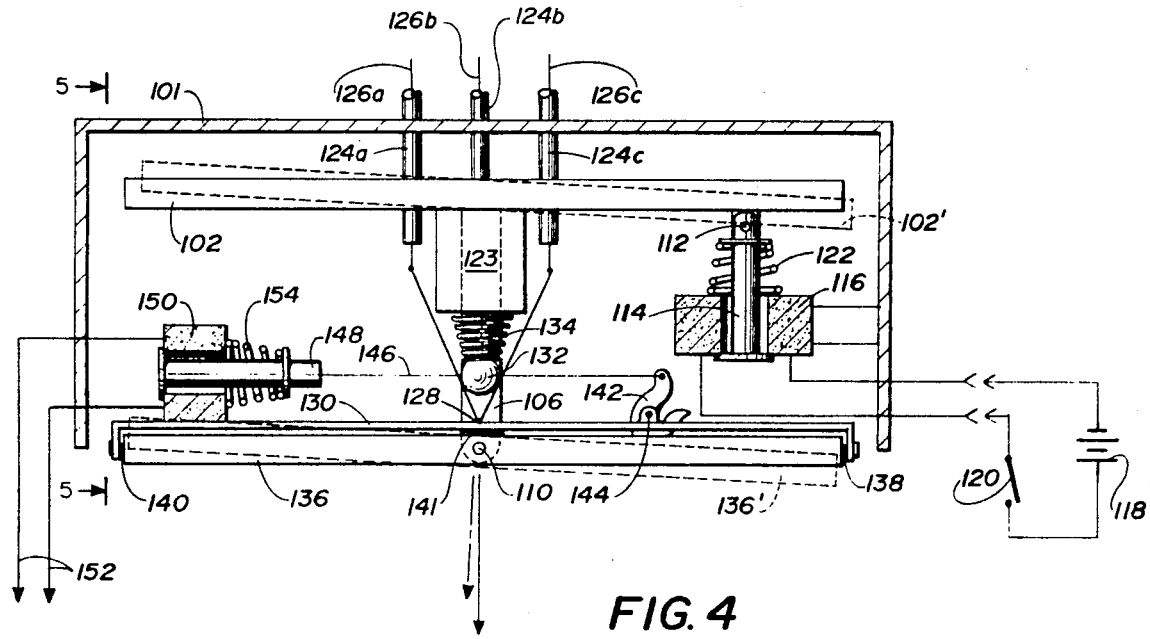
FIG. 4 is a top view of the preferred embodiment of the invention.
Figure 5:
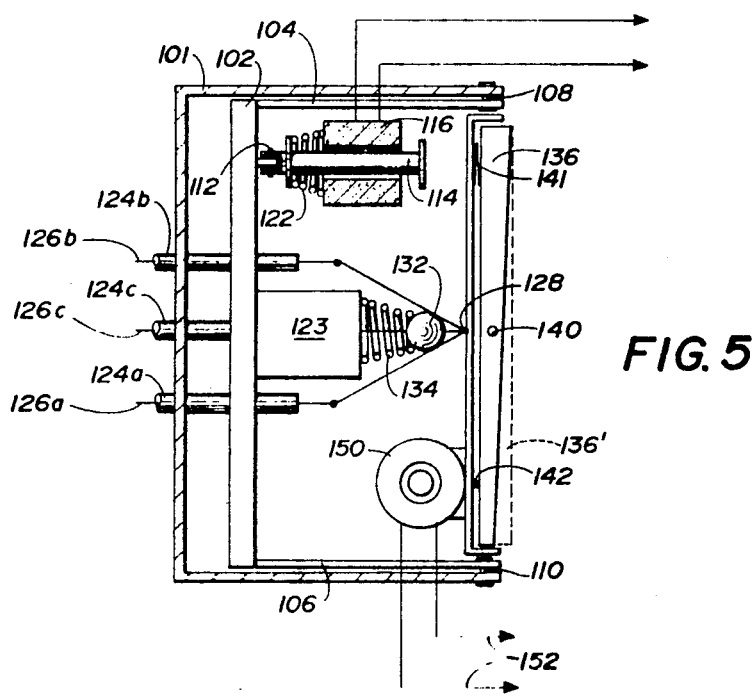
FIG. 5 is a sectional view of the mirror assembly shown in FIG. 4 taken generally along the section lines 5—5.

FIGS. 4–5 illustrate the preferred embodiment of the present mirror assembly, the upper portion of the housing removed in FIG. 4 for simplicity of illustration. The assembly includes a housing 101 which may be suitably attached to the vehicle in the manner previously described. Referring to FIGS. 2 and 3, it will be seen that the mirror is not pivoted about its central axis upon operation, and thus lateral movement of the mirror occurs. The embodiment shown in FIGS. 4 and 5 pivots the mirror about its central axis to eliminate such lateral movement of the mirror.

A rear support member 102 includes an upper extension 104 and a lower extension member 106. The upper extension member 104 is pivotally connected with the housing 101 by a pin 108, while the lower extension 106 is pivotally connected to the housing 101 by a pin 110. One end of the rear member 102 is pivotally connected by pin 112 to the end of a solenoid shaft 114. A solenoid coil 116 is connected to the vehicle battery 118 and the vehicle turn indicator switch 120. A spring 122 normally maintains the solenoid shaft 116 in the illustrated position.

A block 123 is rigidly connected to the rear member 102. Sleeves 124a–c are also rigidly carried by the rear member 102 and slidably extend through the rear wall of the housing 101. Wires 126a–c extend through the sleeves and are terminated at a common point 128 on the rear of a mirror housing 130. A ball 132 is held in contact with the wires 126a–c by a spring 134 in the manner previously described. As best shown in FIG. 4, a mirror 136 is connected within the housing 130 by pivot pins 138 and 140. A spring 141 is disposed between housing 130 and mirror 136. A cam member 142 is pivotally connected to the housing 130 by a pin 144. The end of the cam 142 is connected by a rigid wire 146 to the end of a solenoid rod 148. In some embodiments, it may be desirable to utilize a slidable wedge in place of the cam member 142. A solenoid coil 150 is connected via wires 152 to a vehicle light energizing circuit (not shown) of the type shown in FIGS. 2 and 3. A spring 154 is disposed between the solenoid and a retaining ring on the solenoid rod 148.

In operation of the mirror shown in FIGS. 4 and 5 during normal operation, the mirror assembly provides a direct rearward view as shown in FIG. 1a and is in the normal glare position. When the turn indicator 120 is thrown to indicate an upcoming left turn, current is supplied to the solenoid coil 116 which then moves the solenoid shaft 114 against the spring 122. The movement of the shaft 114 causes the rear member 102 to be pivoted about the pivot point 110 to the dotted line position 102'. Since the block 123 primarily supports the mirror housing 130 and the mirror 136 through the spring 134 and the ball 132, the mirror housing 130 and the mirror 136 are pivoted to the dotted line position 136'.

Position 136' shown in FIG. 4 thus provides a field of vision such as shown in FIG. 1b to assist in making a left-hand turn. The advantage of this particular embodiment is that the mirror 136 is pivoted about its central axis and no lateral mirror displacement results. The wires 126a–c may be manually operated from the driver compartment of the vehicle, in a manner to be subsequently described, in order to suitably position the mirror 136 according to particular desired characteristics for normal driving.

When the vehicle headlights are energized, the solenoid coil 150 is energized, thereby retracting the solenoid rod 148 and pivoting the cam 142 about the pin 144. This pivoting of the cam 142 bears against the lower side of the mirror 136 to pivot the mirror 136 about the pins 138 and 140 to the dotted line position 136' shown in FIG. 5. This position places the mirror in the non-glare position to alleviate the effects of bright headlights during nighttime operation. When the headlights are turned off, or when the bypass button illustrated in FIGS. 2 and 3 is operated, the solenoid 150 is deenergized and the solenoid rod 148 returns to the position illustrated in FIG. 4. The rigid wire 146 then moves the cam 142 back to the illustrated position in order to rotate the mirror 136 back to the normal operating position. Spring 141 ensures the return of mirror 136 to the normal position. In this embodiment, the mirror 136 is rotated in the horizontal plane also through its center to eliminate any vertical movement of the mirror.

FIG. 6 illustrates a mirror 200 of the type previously described, with the housing and solenoid structure removed for ease of illustration. The mirror 200 is connected at point 202 to the ends of three wires 204a–c which extend through sleeves 206a–c. The opposite ends of the wires 204a–c are commonly connected at point 208 to the end of a manually operable lever 210. A ball 212 is held against the wires 204a–c by a spring 214 which is biased against a fixed member 216. Additionally, a ball 218 is biased against the wires 204a–c by a spring 220 which is biased against a fixed support 222. Movement of the lever 210 thus causes like movement of the mirror 200 to enable selective adjustment of the mirror.

A fourth wire 224 extends through a sleeve 226 and is connected to a cam 228 which bears against the rear of the mirror 200. The end of wire 224 is disposed within the driver compartment of the vehicle and is attached to push-pull knob 230. Manual operation of the knob 230 thus allows selective operation of the mirror 200 between glare and non-glare positions, without the requirement of energizing the vehicle headlights. The embodiment shown in FIG. 6 may be incorporated into either of the embodiments previously described in order to enable manual operation of the mirror between glare and non-glare positions, or between different field of vision positions. Alternatively, two such wires could be incorporated into the system to enable movable operation of the mirror between glare and non-glare positions, and between different fields of vision.

FIGS. 7–9 illustrate an embodiment of a mirror for selective reduction of glare. A first polarized transparent member 250 is rigidly connected within a housing 252 which may be attached within an assembly such as shown in FIGS. 4 and 5. A second member comprises a transparent polarized layer 254 connected to a mirror reflecting surface 256. Mirror 256 is rotatable about an axis 258. A solenoid coil 260 is rigidly connected to the housing 252 and is selectively energizable via conductors 262. A solenoid shaft 264 is pivotally connected to the rear of the mirror 256.

Upon energization of the coil 260, the shaft 264 is retracted to thereby rotate the mirror 256 about the axis 258. As best shown in FIG. 9, the member 250 and the layer 254 are constructed from polarized transparent material. When the two members are oriented as shown in FIG. 9, light tends to be filtered out by the mirror assembly and a non-glare condition exists. In normal operating conditions, the layer 254 is rotated in the direction indicated by the arrow 270 such that the polarization of the layer 254 is lined up with member 250. In this condition, light may pass through member 250 and layer 254, reflect from the mirror surface 256 and pass back through the layer 254 and member 250 without substantial reduction in intensity for use in a normal daytime operation.

FIGS. 10–11 illustrate another embodiment of a non-glare mirror for use in either assembly shown in FIGS. 2–5. This embodiment utilizes a fixed transparent member 280 which includes a plurality of polarized section 282 of one polarization direction, with sections 284 comprised of material having an opposite polarization direction. A second member is disposed behind member 280 and comprises a first transparent portion comprised of sections 286 constructed from material having one polarized direction and sections 288 comprised of material of another polarized direction. A mirror reflecting surface 289 is disposed on the rear of the assembly to provide reflection. A solenoid 290 may be selectively energized by electricity through wires 292 to operate solenoid shaft 293 to move the second member laterally with respect to the fixed member 280.

When the two members shown in FIGS. 10 and 11 are in a position such that sections 282 and 286 are adjacent one another, substantially no loss in reflection of the mirror occurs. However, when non-glare operation is required, the solenoid 290 is energized to move the rear member for a distance of one section such that the sections 286 are disposed adjacent sections 284. Due to the difference in polarization of these sections, the reflection of the mirror is reduced to provide non-glare operation. It will be understood that a variety of polarized material such as laminated plastic films are available for use with the invention. As earlier noted, the non-glare mirrors shown in FIGS. 7–11 may be incorporated into either of the embodiments shown in FIGS. 2–5.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A vehicle rear view mirror assembly comprising:
   a housing adapted for mounting on a vehicle;
   a support pivotally connected within the housing for movement about a first axis between two extreme positions;
   block means pivotally connected to the support for movement about a second axis extending perpendicularly to the first axis between a normal operating position and an anti-glare position;
   a mirror connected to the block means;
   means for controlling the movement of said mirror about said first and second axes in dependence upon operation of the vehicle light switch and the vehicle turn signal indicator, and
   manually operable means extending from said housing into the passenger compartment of the vehicle for selective movement of said mirror.

2. The vehicle mirror of claim 1 wherein said means for controlling the movement of said mirror comprise solenoid means energizable by operation of the vehicle light switch and the vehicle turn signal indicator.

3. The vehicle mirror of claim 1 and further comprising:
   means for moving said mirror to said normal operating position when the vehicle light switch is energized.

4. A vehicle rear view mirror assembly comprising:
   a mirror movable about a horizontal axis between a normal operating position and an anti-glare position,
   structure supporting said mirror and movable about a vertical axis between two extreme positions for varying the field of vision provided by said mirror,
   means for controlling the movement of said mirror about said horizontal and vertical axes in dependence upon operation of the vehicle light switch and the vehicle turn signal indicator,
   a plurality of wires extending from the vehicle passenger compartment to said mirror assembly,
   ball means disposed at each end of said wires,
   one end of said wires being coupled to said mirror,
   the other end of said wires being coupled to a lever manually movable within the passenger compartment, and
   spring means urging said ball means against the ends of said wires to facilitate movement of said mirror upon movement of said lever.

5. A vehicle rear view mirror assembly comprising:
   a housing adapted to be mounted on a vehicle,
   a support pivotally connected within said housing for movement about a vertical axis between two extreme positions,
   block means pivotally connected to said support for movement about a horizontal axis within said housing,
   a mirror connected to said block means,
   means for controlling the movement of said block means about said horizontal axis in dependence upon operation of the vehicle light switch, and
   means for controlling the movement of said support in dependence upon operation of the vehicle turn signal indicator.

6. The vehicle mirror of claim 5 and further comprising:
   manually operable means extending from said housing into the passenger compartment of the vehicle for selective movement of said mirror.

7. The vehicle mirror of claim 5 wherein said means for controlling comprises solenoids.

References Cited
UNITED STATES PATENTS

| | | | |
|---|---|---|---|
| 3,199,075 | 8/1965 | Simmons | 350—289 X |
| 3,337,286 | 8/1967 | Weiszeck | 350—283 |
| 3,468,186 | 9/1969 | McIntyre et al. | 350—289 X |
| 3,473,867 | 10/1969 | Byrnes | 350—279 |

FOREIGN PATENTS

| | | | |
|---|---|---|---|
| 1,021,429 | 3/1966 | Great Britain | 350—281 |

JOHN K. CORBIN, Primary Examiner

U.S. Cl. X.R.

350—159, 283